United States Patent
Krishnan

(10) Patent No.: US 10,157,640 B2
(45) Date of Patent: Dec. 18, 2018

(54) SYSTEM AND METHOD FOR USE IN PLAYING BACK PANORAMA VIDEO CONTENT

(71) Applicant: Sony Computer Entertainment Inc., Tokyo (JP)

(72) Inventor: Rathish Krishnan, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 58 days.

(21) Appl. No.: 14/340,152

(22) Filed: Jul. 24, 2014

(65) Prior Publication Data

US 2016/0012855 A1  Jan. 14, 2016

Related U.S. Application Data

(60) Provisional application No. 62/024,354, filed on Jul. 14, 2014.

(51) Int. Cl.
  *H04N 9/80* (2006.01)
  *G11B 27/10* (2006.01)
  (Continued)

(52) U.S. Cl.
  CPC ....... *G11B 27/105* (2013.01); *H04N 5/23238* (2013.01); *H04N 5/2628* (2013.01); *H04N 21/21805* (2013.01); *H04N 21/816* (2013.01)

(58) Field of Classification Search
  CPC ........... H04N 5/2628; H04N 21/21805; H04N 5/23238
  (Continued)

(56) References Cited

U.S. PATENT DOCUMENTS 4,208,811 A   6/1980  Junowicz
6,331,869 B1  12/2001  Furlan
(Continued)

FOREIGN PATENT DOCUMENTS

EP  1064817       10/2005
EP  2434772 A1   3/2012
(Continued)

OTHER PUBLICATIONS renderstuff.com; "Creating Virtual 360 Panorama"; Tutorial from http://renderstuff.com/creating-virtual-360-panorama-cg-tutorial/; Printed Jun. 5, 2014; 8 Pages.
(Continued)

*Primary Examiner* — Thai Tran
*Assistant Examiner* — Jose Mesa
(74) *Attorney, Agent, or Firm* — Fitch, Even, Tabin & Flannery LLP

(57) ABSTRACT

Some embodiments provide methods of playing back content, comprising: accessing video content comprising a series of frames that if fully decoded would extend beyond a viewer's field of view, and wherein each encoded frame comprises multiple encoded sections; determining a field of view of the viewer; identifying one or more sections of the first frame that are at least partially within the field of view; decoding the one or more sections of the first frame while not decoding one or more of the sections of the first frame that are not within the field of view; and displaying the one or more decoded sections of the first frame such that the portion of the first frame is displayed, and wherein less than all of the first frame is decoded and less than all of the first frame is displayed during playback.

21 Claims, 7 Drawing Sheets

(51) Int. Cl.
| | |
|---|---|
| *H04N 5/232* | (2006.01) |
| *H04N 21/218* | (2011.01) |
| *H04N 21/81* | (2011.01) |
| *H04N 5/262* | (2006.01) |

(58) Field of Classification Search
USPC ........................................................ 286/241
See application file for complete search history.

(56) References Cited

U.S. PATENT DOCUMENTS

| | | | |
|---|---|---|---|
| 6,362,842 | B1 | 3/2002 | Tahara |
| 6,559,846 | B1 | 5/2003 | Uyttendaele |
| 6,762,789 | B1 | 7/2004 | Sogabe |
| 6,788,333 | B1 | 9/2004 | Uyttendaele |
| 8,184,069 | B1 | 5/2012 | Rhodes |
| 8,914,305 | B2 | 12/2014 | Buck |
| 8,990,682 | B1 | 3/2015 | Wong |
| 9,462,230 | B1 | 10/2016 | Agrawal |
| 9,876,780 | B2 | 1/2018 | Kuper |
| 2002/0021353 | A1 | 2/2002 | DeNies |
| 2003/0011619 | A1 | 1/2003 | Jacobs |
| 2004/0239763 | A1* | 12/2004 | Notea .................... H04N 5/222 348/169 |
| 2005/0273185 | A1 | 12/2005 | Teiwes |
| 2007/0153023 | A1* | 7/2007 | Chladny ................ G06T 15/20 345/611 |
| 2007/0188521 | A1 | 8/2007 | Miller |
| 2008/0036875 | A1 | 2/2008 | Jones |
| 2009/0097710 | A1* | 4/2009 | Sroka .................... G06T 7/0026 382/103 |
| 2009/0129693 | A1 | 5/2009 | Bloebaum |
| 2009/0273710 | A1 | 11/2009 | Pearlstein |
| 2009/0278921 | A1 | 11/2009 | Wilson |
| 2012/0242781 | A1 | 9/2012 | Gautier |
| 2012/0262540 | A1 | 10/2012 | Rondinelli et al. |
| 2012/0265856 | A1 | 10/2012 | Major |
| 2012/0295708 | A1 | 11/2012 | Hernandez-Abrego |
| 2012/0306933 | A1 | 12/2012 | Osako |
| 2013/0128364 | A1* | 5/2013 | Wheeler ................ A61B 3/113 359/630 |
| 2013/0266065 | A1 | 10/2013 | Paczkowski |
| 2013/0271565 | A1 | 10/2013 | Chen et al. |
| 2013/0293672 | A1 | 11/2013 | Suzuki |
| 2014/0087877 | A1* | 3/2014 | Krishnan ................ A63F 13/65 463/33 |
| 2014/0096077 | A1 | 4/2014 | Jacob |
| 2014/0123162 | A1 | 5/2014 | Karlsson |
| 2014/0282750 | A1 | 9/2014 | Civiletto |
| 2015/0012403 | A1 | 1/2015 | Buck |
| 2015/0172544 | A1* | 6/2015 | Deng .................... G06T 9/001 348/36 |
| 2015/0193395 | A1 | 7/2015 | Nicolaou |
| 2015/0234457 | A1 | 8/2015 | Kempinski |
| 2015/0277710 | A1 | 10/2015 | Lee |
| 2016/0029091 | A1* | 1/2016 | Le Floch ....... H04N 21/234345 375/240.26 |
| 2016/0286119 | A1 | 9/2016 | Rondinelli |
| 2016/0353090 | A1 | 12/2016 | Esteban |
| 2016/0379415 | A1 | 12/2016 | Espeset |
| 2017/0282062 | A1 | 10/2017 | Black |
| 2017/0364760 | A1 | 12/2017 | Canella |
| 2018/0004285 | A1 | 1/2018 | Castleman |
| 2018/0007339 | A1 | 1/2018 | Castleman |
| 2018/0007422 | A1 | 1/2018 | Castleman |
| 2018/0075635 | A1 | 3/2018 | Choi |

FOREIGN PATENT DOCUMENTS

| | | |
|---|---|---|
| EP | 2529811 | 12/2012 |
| JP | 2004056335 | 2/2004 |
| JP | 2012070378 | 4/2012 |
| JP | 2013012181 | 1/2013 |
| JP | 2014072608 | 4/2014 |
| WO | 0008889 | 2/2000 |
| WO | 2015184416 | 12/2015 |

OTHER PUBLICATIONS

Patent Cooperation Treaty; "Notification of Transmittal of the International Search Report and the Written Opinion of the International Searching Authority, or the Declaration" issued in corresponding PCT Application No. PCT/US15/36224, dated Sep. 21, 2015; 2 pages.
Patent Cooperation Treaty; "International Search Report" issued in corresponding PCT Application No. PCT/US15/36224, dated Sep. 21, 2015; 2 pages.
Patent Cooperation Treaty; "Written Opinion of the International Searching Authority" issued in corresponding PCT Application No. PCT/US15/36224, dated Sep. 21, 2015; 8 pages.
Japanese Patent Office; "Notification of Reason(s) for Refusal" issued in Japanese Patent Application No. 2017-502168, dated Apr. 3, 2018, 20 pages (Includes English Translation).
European Patent Office; "Extended European Search Report" issued in European Patent Application No. 15822840.3, dated Feb. 26, 2018, 8 pages.
Patent Cooperation Treaty; "Notification of Transmittal of the International Search Report and the Written Opinion of the International Searching Authority, or the Declaration" issued in PCT/US17/35057, dated Aug. 23, 2017; 2 pages.
Patent Cooperation Treaty; "Written Opinion of the International Searching Authority" issued in PCT/US17/35057, dated Aug. 23, 2017; 14 pages.
Patent Cooperation Treaty; "International Search Report" issued in PCT/US17/35057, dated Aug. 23, 2017; 2 pages.
Cig, Cagla & Sezgin, Tevfik Metin; "Gaze-Based Virtual Task Predictor", GazeIn'14, ACM, Nov. 16, 2014, 6 pages.
Patent Cooperation Treaty; "Notification of Transmittal of the International Search Report and the Written Opinion of the International Searching Authority, or the Declaration" issued in PCT Application No. PCT/US17/35058, dated Sep. 25, 2017, 2 pages.
Patent Cooperation Treaty; "International Search Report" issued in PCT Application No. PCT/US17/35058, dated Sep. 25, 2017, 4 pages.
Patent Cooperation Treaty; "Written Opinion of the International Searching Authority" issued in PCT Application No. PCT/US17/35058, dated Sep. 25, 2017, 10 pages.
Patent Cooperation Treaty; "Notification of Transmittal of the International Search Report and the Written Opinion of the International Searching Authority, or the Declaration" issued in PCT Application No. PCT/US17/35060, dated Aug. 4, 2017, 2 pages.
Patent Cooperation Treaty; "International Search Report" issued in PCT Application No. PCT/US17/35060, dated Aug. 4, 2017, 2 pages.
Patent Cooperation Treaty; "Written Opinion of the International Searching Authority" issued in PCT Application No. PCT/US17/35060, dated Aug. 4, 2017, 10 pages.
Patent Cooperation Treaty; "Invitation to Pay Additional Fees and, Where Applicable, Protest Fee" issued in PCT Application No. PCT/US17/35058, dated Aug. 3, 2017, 2 pages.
Wikipedia; "Immersive video", https://en.wikipedia.org/wiki/Immersive-video, printed on Jun. 23, 2016, 2 pages.
Wikipedia; "Omnidirectional camera", https://en.wikipedia.org/wiki/Omnidirectional_camera, printed on Jun. 23, 2016, 4 pages.
James, Paul; "Hands on: SMI Proves that Foveated Rendering is Here and it Really Works", Road to VR, https://www.roadtovr.com/hands-on-smi-proves-that-foveated-rendering-is-here-and-it-really-works/, Jan. 10, 2016, 6 pages.
USPTO; Office Action issued in U.S. Appl. No. 15/280,962, dated Jun. 26, 2018, 11 pages.
Ngo Quang Minh Khiem et al.; "Adaptive Encoding of Zoomable Video Streams based on User Access Pattern;" Feb. 23, 2011, http://www.cs.princeton.edu/-qngo/docs/mmsys2011-adaptive-encoding.pdf (Year: 2011); pp. 211-222.

(56) References Cited

OTHER PUBLICATIONS

USPTO; Office Action issued in U.S. Appl. No. 15/280,947, dated May 16, 2018, 25 pages.
USPTO; Office Action issued in U.S. Appl. No. 15/280,933, dated Jun. 8, 2018, 13 pages.
Japanese Patent Office; "Decision to Grant a Patent" issued in Japanese Patent Application No. 2017-502168, dated Sep. 4, 2018, 3 pages.

* cited by examiner

SYSTEM AND METHOD FOR USE IN PLAYING BACK PANORAMA VIDEO CONTENT

This application claims the benefit of U.S. Provisional Application No. 62/024,354 filed Jul. 14, 2014, entitled SYSTEM AND METHOD FOR USE IN PLAYING BACK PANORAMA VIDEO CONTENT, by Rathish Krishnan, which is incorporated in its entirety herein by reference.

BACKGROUND

1. Field of the Invention

The present invention relates generally to multimedia content, and more specifically to configuring multimedia content.

2. Discussion of the Related Art

Large amounts of visual multimedia content are available to users. Some of this content is intended to be viewed through a virtual environment. Similarly, some content comprises images and/or frames that if it were fully displayed extend beyond a user's current field of view. The user often must change a position and/or orientation of her field of view in order to view other areas of a frame that extends beyond the users field of view.

SUMMARY OF THE INVENTION

Some embodiments provide methods of playing back multimedia content, comprising: accessing video content comprising a series of frames of visual content configured to be sequentially played back, wherein each frame of the series of frames if fully decoded would extend beyond a viewer's field of view, and wherein each encoded frame comprises multiple encoded sections; determining, prior to a portion of a first frame being displayed, a field of view of the viewer viewing the video content; identifying, as a function of the field of view, one or more sections of the first frame that are at least partially within the field of view and where at least a portion of the one or more sections are to be visible to the viewer upon displaying the portion of the first frame; decoding the one or more sections of the first frame that are at least partially within the field of view while not decoding one or more of the sections of the first frame that are not within the field of view; and displaying, according to playback timing of the video content and corresponding to when the first frame is to be displayed, the one or more decoded sections of the first frame such that the portion of the first frame is displayed, and wherein less than all of the first frame is decoded and less than all of the first frame is displayed during playback.

Further, some embodiments provide methods of encoding video content, comprising: accessing video content comprising multiple frames of visual content, wherein each of the multiple frames if fully displayed would extend beyond a field of view of a viewer; applying rectilinear projection to each frame of the multiple frames when the frame is in an equirectangular format; dividing each of the frames into a plurality of adjacent sections such that the plurality of adjacent sections of a frame extend over an entire area of the rectilinear frame; and encoding, for each frame of the multiple frames, each of the plurality of sections such that each section of a frame is decodable independent of the other sections of the frame.

BRIEF DESCRIPTION OF THE DRAWINGS

The above and other aspects, features and advantages of several embodiments of the present invention will be more apparent from the following more particular description thereof, presented in conjunction with the following drawings.

Figure 1A:
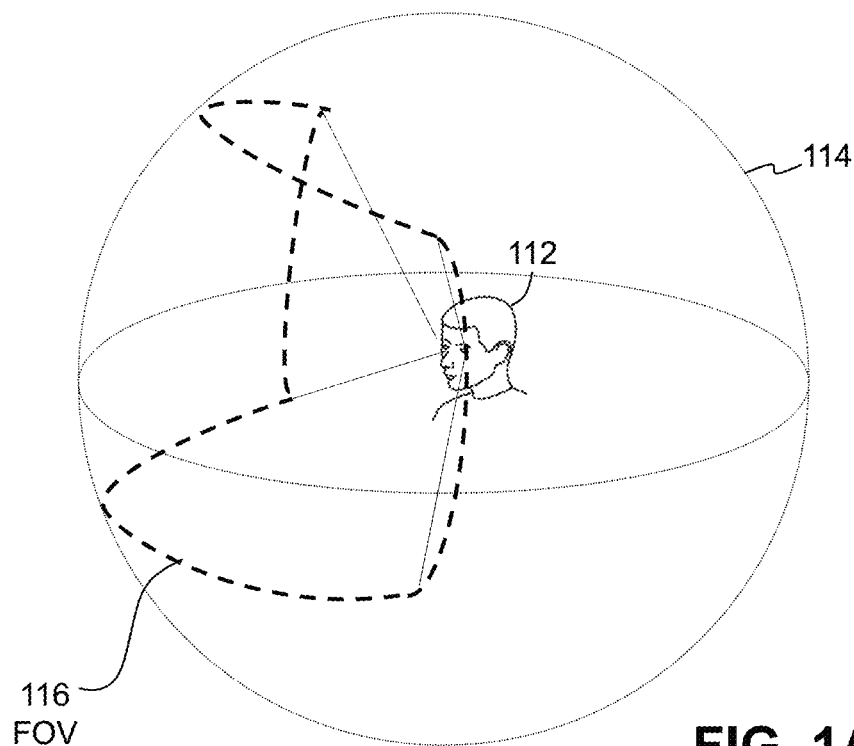
FIG. 1A shows a simplified perspective view of a user or viewer positioned relative to a virtual area over which panoramic content may be displayed and/or appear to the viewer as being displayed, in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Many systems display content that extend beyond a viewer's current field of view (FOV). For example, many systems display panoramic content. Further, in at least some instances the panoramic content can be intended to virtually extend 360 degrees around a viewer so that as a viewer turns, the viewer can view other portions of the content. As one non-limiting example, panoramic content may be displayed to a viewer through a head mounted display (HMD). At any point in time the viewer can typically only view a portion of the panoramic content based on the viewer's field of view. As the viewer moves (or issues instructions to change a field of view) the portion of the panoramic content that becomes visible within the viewer's field of view changes in accordance with the viewer's movement (or instructions).

Figure 1B:
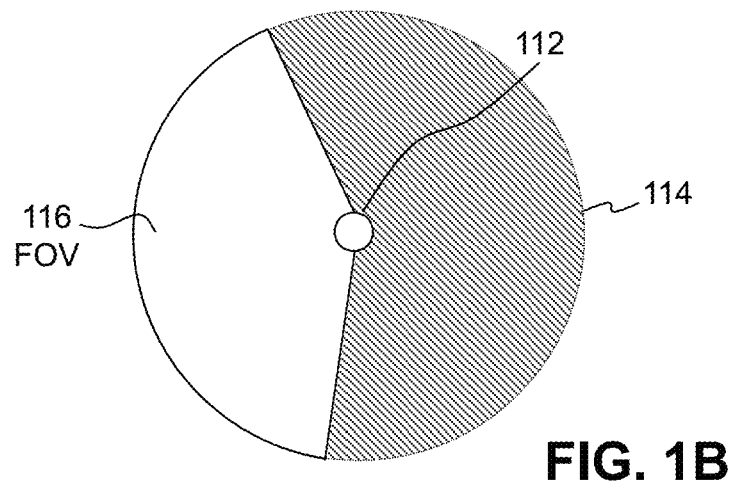
FIG. 1B shows a simplified, overhead plane view of the viewer positioned relative to the virtual area of FIG. 1A, in accordance with some embodiments.

FIG. 1A shows a simplified perspective view of a user or viewer 112 positioned relative to a virtual area 114 over which panoramic content may be displayed and/or appear to the viewer as being displayed, in accordance with some embodiments. FIG. 1B shows a simplified, overhead plane view of the viewer 112 positioned relative to the virtual area 114 of FIG. 1A, in accordance with some embodiments. Referring to FIGS. 1A-1B, in this representation, the panoramic content is intended to extend 360 degrees laterally around the viewer. In some instances, the panoramic content may further extend or virtually extend over the viewer, such as appearing to the viewer as extending approximately 180 degrees vertically (+90 to −90 degrees from viewpoint) and/or 360 degrees around the viewer.

The viewer 112 has a limited field of view (FOV) 116. In many instance with panoramic content, the viewer's field of view 116 extends across only a percentage of the panoramic content, and often is typically less than 50% of the panoramic content. With many display systems, the viewer can move her/his head and/or body (or cause the content to scroll) to change the position of her/his field of view to see other portions of the panoramic content as it is displayed.

Panoramic content, such as panoramic video content, that has 360 degrees of horizontal field of view and 180 degrees of vertical field of view provides the viewer with a complete view of the environment and the freedom to change her/his field of view 116 to view portions of the panoramic content from any direction. Creating such panoramic content often employs the use of multiple cameras pointing in different directions from the same position. The images captured from each camera can then be stitched together using image processing algorithms to align the images and to eliminate overlap.

The panoramic content could be created in different formats depending on intended use cases. For example, with some panoramic content that has a larger field of view in one direction and a restricted field of view in the other, planar panoramas or cylindrical panoramas may be suitable, and the entire area covered by a displayed planar or cylindrical panoramic content may be viewed by moving or scrolling in one direction. But for full 360×180 degree panoramic content, the above mentioned panorama formats are typically not as suitable as a spherical panorama format. When used for still images or video frames, spherical panoramas are typically represented in the equirectangular format, which represent 360 degrees on a horizontal axis and 180 degrees on a vertical axis.

Figure 2:
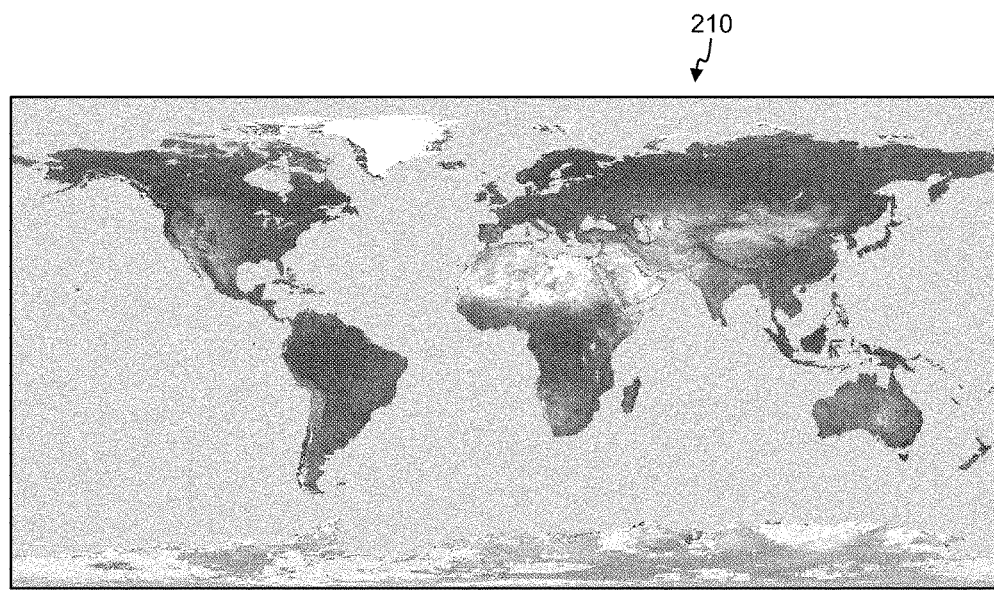
FIG. 2 shows an exemplary image of a spherical panoramic content that is represented in an equirectangular format.

FIG. 2 shows an exemplary image of a spherical panoramic content 210 that is represented in an equirectangular format. The horizontal axis 212 of the panoramic content represents 360 degrees on a horizontal axis relative to a viewer's position. Further, the vertical axis 214 of the panoramic content represents 180 degrees on a vertical axis relative to the viewer's position. Typically, in equirectangular format images, frames and the like, horizontal curves can be seen and the top and bottom of the image 210 appear extremely distorted. While viewing a portion of the panoramic content based on the viewer's field of view (e.g., using a computer screen, a Head Mounted Display (HMD), or the like), rectilinear projection is performed to convert the horizontal curves as straight lines before the panoramic content is played back or displayed.

As introduced above, in some techniques for creating video panorama files, video frames from multiple cameras are stitched together to create equirectangular video frames that when displayed extend beyond the viewer's field of view. Similarly, many techniques for creating compressed video panorama files include stitching video frames from multiple cameras to create equirectangular video frames before compressing the equirectangular video frames using a video compression format such as H.264/MPEG-4 Advanced Video Coding (AVC), High Efficiency Video Coding (HEVC) or other such compression. To display the content allowing a viewer to view the portion of the panorama content (e.g., through an HMD) within the viewer's FOV, entire equirectangular video frames are typically uncompressed and the portion of each frame is realigned using, for example, rectilinear projection to compensate for the distortion in the equirectangular format images or frames. Accordingly, the system playing back the panoramic video content typically has to perform large amounts of video processing to decode the entire equirectangular video frames.

Some embodiments, however, reduce the computational and/or at least decoding processing overhead in preparing to playback panoramic content by specifying sections and/or dividing panoramic frames into sections. These sections can then be encoded to allow the encoded sections to later be decoded independent of other segments of the panoramic frame.

Figure 3:
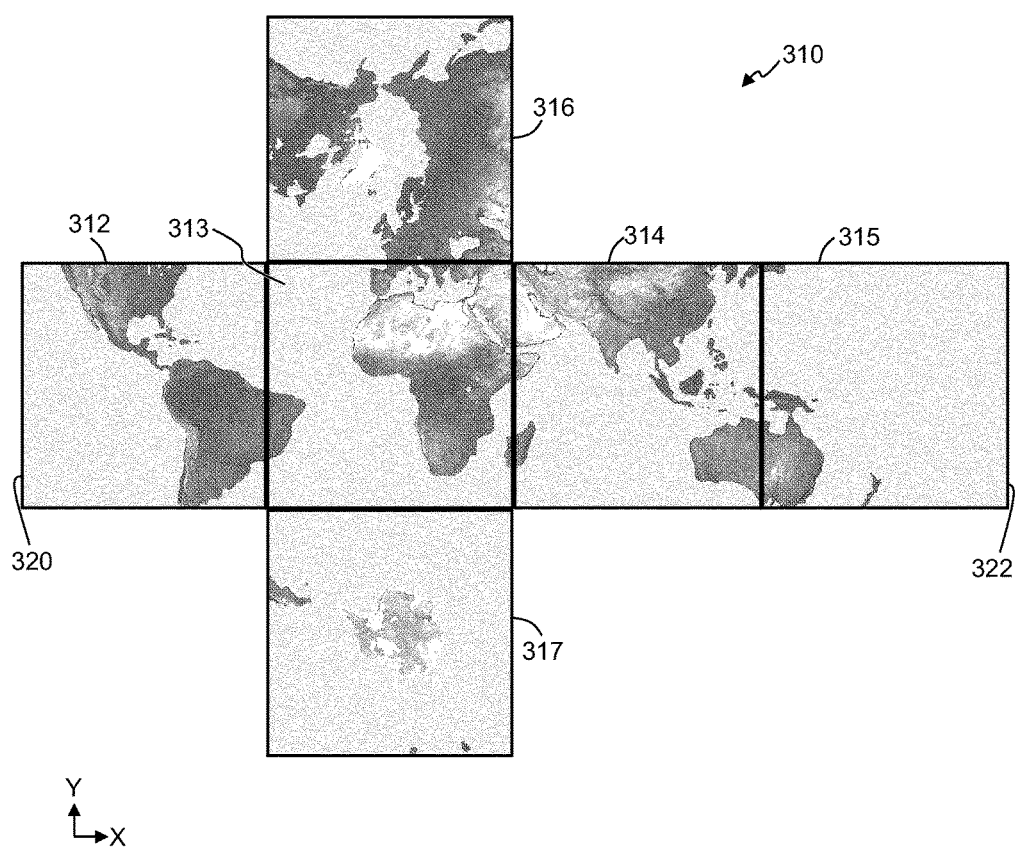
FIG. 3 shows a simplified, exemplary representation of a panoramic frame that is divided into multiple sections, in accordance with some embodiments.

FIG. 3 shows a simplified, exemplary representation of a panoramic frame 310 that is divided into multiple sections 312-317, in accordance with some embodiments. In some implementations, rectilinear projection is applied to create the multiple sections 312-317 of the frames of the video panorama before it is encoded. This can provide improved coding efficiency and better picture quality as there are less or no distortions to affect the encoding processes such as motion estimation. The sections, in some implementations, are non-overlapping sections of the video frame. Further, the sections allow for fast decoding, as individual sections can typically be decoded independently of other sections of a frame, and in some instances the decoding process may even be bypassed.

The panoramic frame 310 shows the equirectangular image of FIG. 2, but recreated as six non-overlapping sections 312-317. For example, these sections can generally represent, based on a certain field of view, a left section 312, a front section 313, a right section 314, a back section 315, an overhead or top section 316 and a lower or bottom section 317. Again, the representation in FIG. 3 is provided as a non-limiting example showing six sections. Other embodiments may specify or define the frames and/or images into more or fewer sections. For example, in some implementations, panoramic frames may be divided into 4 sections, 12 sections, 24 sections, 60 sections or other numbers of sections. The number of sections utilized can depend on many factors, such as but not limited to, processing capabilities of the playback device, desired latency, field of view of the panorama content (horizontal and vertical), field of view of the display (horizontal and vertical), overhead associated with sections, available storage, available memory, available bandwidth and/or bandwidth predicted to be available, and other such factors or combinations of such factors. For example, the number of sections may be limited as an amount of header information and/or other information typically associated with each section utilized with the encoded bitstreams increases, which may reduce compression efficiency (e.g., such as with content being streamed over a distributed network). In some implementations, the sections may be defined in accordance with the rectilinear projections (e.g., six rectilinear projections can be used to generate six sections) when the frames of the content are in the equirectangular format. In other embodiments, portions of a frame defined by rectilinear projection may be further defined into additional segments. Similarly, when rectilinear projection is not used the frames are divided into the plurality of adjacent sections. Again, some embodiments, the plurality of adjacent sections of a frame extend over an entire area of the frame.

Some embodiments are further configured to define different sections of a frame to have different shapes and/or sizes, or otherwise extend over different amounts of area of the panoramic frame. For example, in some embodiments the sections defined along one or more portions of a frame that extend laterally from the viewer may be divided into multiple rectangular sections oriented with the long side extending in a Y direction (virtual to the user's field of view), while sections defined along one or more portions of the frame that extend horizontally from the viewer are divided into multiple rectangular sections oriented with the long side extending in an X direction. Further, sections may be encoded as a separate bitstreams, with different section sizes within the same bitstream. In some implementations the type of application and the panorama content can affect and often may be significant factors in determining the number and/or size of sections. In many instances, users will be viewing along the X direction more often than the Y direction. As such, some implementations define the dimension of a section along the X direction as being smaller than the dimension along the Y direction, which may provide higher efficiency. Further, the coding standard used for creating the bitstream may also influence the orientation of the sections.

Figure 4:
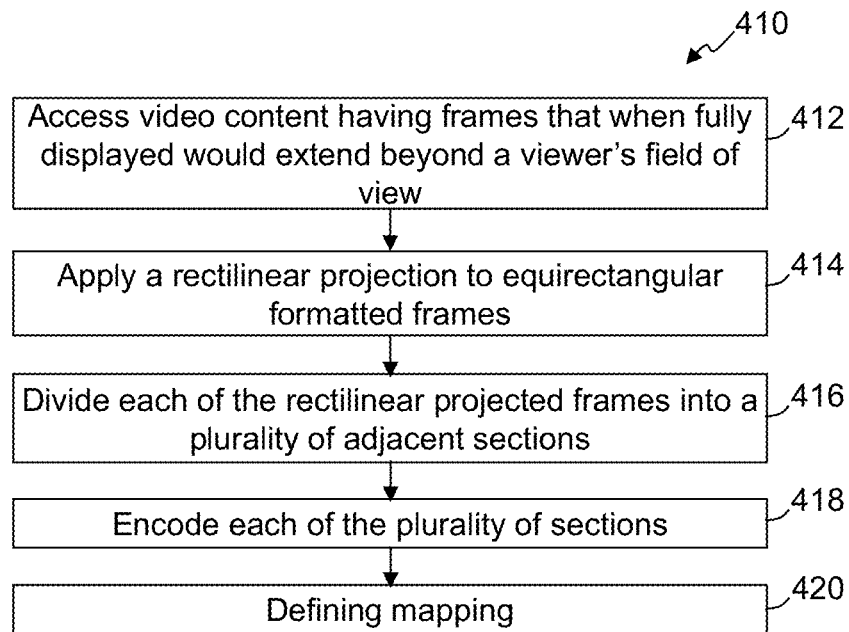
FIG. 4 illustrates a simplified flow diagram of an exemplary process of encoding panoramic content, in accordance with some embodiments.

FIG. 4 illustrates a simplified flow diagram of an exemplary process 410 of encoding panoramic content, in accordance with some embodiments. In step 412, the panoramic content, such as panoramic video content is accessed. Typically, the video content comprises multiple frames of visual content configured to be displayed, and the multiple frames if fully displayed would extend beyond a field of view of a viewer.

Some embodiments include optional step 414, where a rectilinear projection is applied to each frame of the multiple frames when the frame is in an equirectangular format. Again, the rectilinear projection can, at least in part, improve coding efficiency and picture quality because distortions that can affect the encoding processes, such as motion estimation, can be reduced and/or eliminated. Further, in many implementations, the rectilinear projection is applied multiple times over each equirectangular formatted frame to generate sections of the frame or portions of sections of a frame. For example, rectilinear projection may be applied six times to panoramic frames to produce sections 312-317 (as shown in FIG. 3), while in other implementations the rectilinear projection may be applied more or fewer than six times. Still further, in some implementation each projection from the rectilinear projection may be further divided into additional sections of the frame.

In step 416, the sections of each frame are defined and/or each frame is divided into a plurality of adjacent sections extending over each frame and typically multiple sections are defined and extend over an entire area of each frame. In some embodiments, as described above, the rectilinear projection may be used at least in part to generate the sections. In other embodiments, the portions of the frames generated by the rectilinear projection may be split into further sections. The number of sections can depend on one or more factors as described above and further below. For example, the number of sections can depend on a predicted decoding and/or other graphics processing capabilities of the playback device, memory capabilities, expected bandwidths, latency issues and the like. In some implementations, the panoramic content is newly created and/or received from multiple cameras. Time-synchronized frames from each camera can be further processed to eliminate overlap, and then divided into sections. As described above, in some embodiments, the sections can be rectilinear sections.

In step 418, each of the plurality of sections of each of the frames of the multiple frames is encoded. In some embodiments, the encoding is implemented such that for a given frame, each section is configured to be decoded independent of the other sections of the frame. It is noted that one or more sections of a given frame may be dependent on and/or reference one or more sections of one or more other frames. For example, one or more frames may be encoded as P-frames (Predicted picture), B-frames (Bi-predictive picture), and/or other such frames, and as such one or more sections may reference one or more sections of one or more other frames in decoding. In some implementations, each section is encoded as a separate compressed bitstream of the rectilinear video frames. Similarly, in some embodiments, sections can be encoded with different resolutions with each different resolution section configured as separate bitstreams. In other embodiments, a section may be encoded at multiple resolutions with the multiple resolutions of a section contained in a single bitstream. For example, such content streams may be encoded in accordance with the Scalable Video Coding (SVC) standard or other such encoding.

In some embodiments, some or all of the sections are arranged in a single bitstream and encoded while allowing each section to later be decoded independently of at least others sections of the same frame. For example, in some implementations sections are defined as one or more slices, such as those employed in H.264 and HEVC. Additionally or alternatively, some embodiments define sections based on one or more tiles while applying HEVC coding. Similarly, in some embodiments, the sections are arranged as vertical strips with each section being coded as one or more slices in accordance with H.264 coding. During the encoding process, some embodiments define how many slices and/or tiles are used and the structure of the slices and/or tiles. Once each section is encoded as a slice or tile, each slice is configured in many instances to be decoded independently of other slices or tiles.

Further in decoding, in many embodiments, when a frame is referenced by another frame the entire referenced frame does not have to be decoded. Instead, similar to the decoding of a frame of interest, only those portions of the reference frame that are being references have to be decoded. Some embodiments further limit the referencing of sections of a first frame to corresponding sections of a second frame being referenced. For example, some embodiments modify the encoder to limit the motion estimation search range to near section boundaries in attempts to limit or prevent the motion vectors of a frame from referencing one or more pixels in another section of the referenced frame. Additionally or alternatively, some embodiments utilize slices, which often limit or prevent a motion vector to cross boundaries between slices. Similarly, in some implementations, prediction for I-pictures is defined to not cross a slice boundary. Other embodiments are configured to generate separate bitstreams for some or all of the sections, which can limit or avoid a section of a first frame referring to a different section of a reference frame.

Some embodiments further improve the encoding by increasing the number of frames that are independent and/or otherwise do not reference other frames in performing the decoding. For example, in some implementations encoding includes incorporating and/or increasing a number of I-frames (Intra-coded picture frames) than would typically be encoded. The increased number of I-frames, at least in part, allows sections of these I-frames to be independently decoded without reference to one or more other frames. Further, in some implementations, the increased number of independent or non-referencing frames improves quality. The increase can provide that independent or non-referencing frames are encoded as often as once every 10-20 frames, and in some instances as often as every 2-4 frames. Alternatively, some embodiments encode each frame as an I-frame or other similar encoding such that the each frame does not reference or depend on another frame in decoding the one or more sections of a frame. The increased numbers of I-frames may result in an increased amount of data and/or data processing. However, because the decoding is performed on sections and not all of a frame has to be decoded the processing to decode the increased numbers of I-frames is not detrimental to the decoding process and is at least compensated for by the reduced amount of the frame that is decoded.

Similarly, in some embodiments, the encoding is implemented on frames that have higher than typical resolutions. Previous systems typically had limited capabilities to handle greater resolutions because of the processing overhead needed to decode the entire panorama frames. As described above, however, some present embodiments limit the decoding to one or more sections of the frames so that less than the entire frame is decoded. Accordingly, because there is less decoding performed, higher resolution frames can be encoded while typically not adversely affecting the decoding, the playback speed and/or performance of the playback device. Similarly, some embodiments access video content at a resolution for one or more (or each frame) that is higher than predicted to be decodable by an expected playback device, and encodes the sections of the one or more frames with the expectation that less than all of the sections of a frame are to be decoded.

Some embodiments may further encode one or more sections of one or more frames at different resolutions. For example, in some instances, an active section can be anticipated (e.g., based on previous viewers, based on intended focus point, etc.), and the active section and neighboring sections can be encoded at a higher resolution while those sections not expected to be viewed with as much interest and/or frequency may be encoded at a lower resolution. In other implementations, one or more sections of a frame may be encoded at a maximum resolution and also encoded at one or more lower resolutions. For example, sections (or an entire frame) that is encoded with a first resolution, for example 2560×2560, may be encoded at one or more lower resolutions, for example encoding at 1280×1280, 640×640, 160×160 or other such reduced resolution. During playback, when a section is not within a field of view (or is at a periphery of the field of view, or is otherwise not considered as important as one or more other sections), one of the lower resolution sections can be selected to be decoded instead of the high resolution section reducing processing and/or memory overhead. As such, one or more sections of a frame can be decoded at a higher resolution, while one or more sections of the frame are decoded at a lower section. Further, one or more sections of the frame may be skipped and not decoded.

In some implementations, one or more sections of a frame that are determined to be within the field of view (or within a threshold of the field of view) are identified and higher or highest resolution versions of those sections of the content (e.g., of a bitstream) are decoded to generate the pixels that is to be displayed, while one or more other sections are selected to be decoded using lower resolution versions of the sections. For example, the lower resolution versions of sections could be used for decoding regions of a frame that are distant from the field of view (e.g., a fixed distance, a threshold distance, a distance dependent on anticipated movement, or the like). Some embodiments use and/or encode I-frames as transition points between lower resolution and higher resolution versions of sections and/or frames. The lower resolution sections continue to reduce the processing and/or memory requirements of displaying the content.

Still referring to FIG. 4, in step 420 one or more section mappings are generated, which in some embodiments, define relative positional relationships between each section of a frame and one or more other sections of the same frame. In some embodiments, a mapping is generated individually for each frame. In other embodiments, the one or more mappings covers multiple frames, and in some instances a single mapping is generated for a content, with the mapping providing mapping information for sections in each frame. Some embodiments are configured to explicitly define the mapping while other embodiments may be configured additionally or alternatively deduce mapping, for example, through the decoder. In deducing mapping, some embodiments take advantage of knowledge of section positioning, for example, with each section configured as a separate stream. The decoding system can determine or be provided with knowledge of which stream corresponds to a corresponding location (e.g., the top, right, left, etc.). The decoding system can then compute the neighborhood mapping and the section mapping on its own. This may be particularly relevant in a closed system where the fields of view and panorama types are fixed.

Further, in some embodiments, coordinate information is defined in the mapping for each frame, and typically extends over the entire frame. Coordinates and/or boundaries are identified from the coordinate information for each of the sections of the frame. For example, first and second axes can be defined over the sections defined from the rectilinear projection and coordinates defining the boundaries of each section are identified. Additionally, in some implementations the coordinate information is consistent between frames, while in other implementations the coordinate information may be dependent on the frame (e.g., a predefined corner of a frame is designated as an origin from which the coordinate information is specified). In some embodiments, the mapping identifies section position information, which can comprise coordinate information, positional relationships between sections, identifies neighboring sections and/or other such position information. For example, the mapping can be configured to identify, for each section of a frame, neighboring sections and defining positional relationships associating each section of the frame with each neighboring section.

In some embodiments, the mapping defines, for each of the multiple frames, the multiple sections of each frame such that the multiple sections extend across the entirety of a frame. Again, in some implementations, neighboring sections are identified for each section of the frame and the mapping associates each section of the frame with each neighboring section. For example, again referring to the simple example of six sections 312-317 of FIG. 3, each section has four neighbors when the panoramic frame is intended to extend 360 degrees about the user and at least 180 degrees vertical to the user (+90 to −90 degrees). Some embodiments identify an active section as the section that occupies the majority of the display. Still further, in some embodiments, the mapping defines one or more sections in one or more previous or subsequent frames when a section references one or more sections of the one or more previous or subsequent frames (e.g., a section of a P-frame or B-frame).

Furthermore, in many implementations the panorama content is configured to be viewed in 360 degrees laterally from the user, 180 degrees vertical to a viewer and/or 360 degrees spherically about a viewer. As introduced above, in some implementations the sections of a frame are defined from the rectilinear projection (e.g., see FIG. 2). As such, in some embodiments, the mapping further defines wrapping and/or neighboring sections of two or more sections of a frame so that when relevant sections are displayed as the viewer changes her/his field of view the relevant sections appear to the viewer as continuous content. For example, some embodiments identify boundaries of the frame (e.g., boundaries of the rectilinear projection of the frame). Two or more boundary sections of multiple sections of a frame are identified that correspond to boundaries of the frame.

In some embodiments, the mapping can further be configured to define boundaries of sections as adjacent to define an effective 360 degree frame. As a further example, two boundary sections of the multiple sections can be identified, where a first section of the two boundary sections has a boundary corresponding to a first boundary of the frame and a second section of the two boundary sections has a boundary corresponding to a second boundary of the frame. Based on the defined boundary sections, the mapping can define that the first boundary is adjacent to the second boundary defining an effective 360 degree frame such that the first boundary frame is defined as adjacent to the second boundary frame. For example, referring back to FIG. 3, a first boundary 320 of a first section 312 can be defined as adjacent to a second boundary 322 of a second section 315 such that the first section 312 is defined as adjacent to the second section 315. Further, some embodiments obtain pixel data for the sections, which are used to determine and/or generate textures, which can also be mapped on a polygon or a 3D model. In some instances, textures are mapped on to a cube map, and textures per frame are updated for those sections that are to be displayed.

In some embodiments, the mapping is defined to correspond to user movements and/or display movement instructions. The movement information can be used to determine and/or define the field of view. For example, some mappings use the following information to define a field of view:

Pan (sometimes referred to a yaw), which is typically defined in relation to a rotation of the user's (or the camera's) field of view around the user (or the camera, such as axis of a tripod on which a camera is mounted). A frame of reference can be defined, such as 0 degrees is defined as forward, +90 degrees is defined to the right, −90 degrees is defined to the left, and 180 (or −180) is defined as toward the back. Further, pan=0 degrees can be defined as a center of the panorama content.

The tilt (sometimes referred to as pitch), which is typically defined in relation to a vertical rotation of the user (or the camera). The tilt can be defined to equals 0 degrees when the user (or camera) is horizontal, +90 degrees when the view is shifted entirely upwards (e.g., facing above the user's head or toward the sky), and −90 degrees when the view is shifted entirely downward (e.g., facing the user's feet).

The roll, which is typically defined in relation to a rotation around an axis through a center of a field of view (or rotation around the lens axis of the camera). The roll rotation can be defined such that when the roll is positive the image is rotated clockwise; and when the roll rotation is negative the image is rotated counterclockwise.

Some embodiments define the pan, tilt and roll mapping before the content and/or stream of content is decoded. Further, some embodiments take into consideration the number of subsections used within a frame and/or optics of a display system (e.g., optics of an HMD) in defining the pan, tilt and roll mapping, which may be established before the stream is decoded. Based on the determined pan, tilt and/or roll, ranges of pan, tilt and roll values can be mapped to one or more pan, tilt and roll values from, for example, sensor data from an HMD (or movement command from a keyboard, game controller, etc.), and comparing it these limits, one or more flags can be set that denote which sections are to be decoding or not. Some embodiments additionally define mapping for multiple frames and/or an entire sequence, and need not be done on a frame-by-frame basis. The mapping, in some implementations, may further define neighboring sections using the pan, tilt and roll information. Additionally or alternatively, the mapping specifies the neighboring sections and/or neighborhood rules, which in some instances may reduce computations.

Again, because the field of view only extends over a portion of the panoramic frames, typically less than all of the sections are decoded. The mapping can be used to select which of the sections of a frame are to be decoded, while other sections are not decoded. In some embodiments, the determination of those sections that are not to be decoded may be based on a threshold relationship relative to the determined field of view. For example, some embodiments decode those sections that are predicted to be at least partially within the field of view. Other embodiments may use thresholds and not decode those sections that exceed a threshold distance, angle, or the like relative to the current field of view. For example, in the simple case of six sections (such as that shown in FIG. 3), when a tilt of greater than +45 degrees is detected a bottom section 317 could be left undecoded. Similarly, when a tilt is −45 degrees or below, a top section 316 may not be decoded.

Often, panorama content is provided in one or both high resolution and high display frame rates (e.g., content viewed using an HMD, high definition displays, etc.) to provide a quality experience for the viewer. In many previous systems that display large format content, the compressed bitstream or bitstreams of entire frames need to be decoded before the video frames can be displayed. The rate at which a video bitstream can be decoded depends on several factors, including but not limited to the decoder luma sample rate. The decoder luma sample rate corresponds to the number of luminance pixel samples that are to be processed per second by the video decoder. Typically, with other factors remaining the same, the decoding speed decreases as the decoder luma sample rate increases. Some embodiments increase the number of sections of a frame while lowering the number of luminance pixels in each subsection. This can at least help in allowing the skipping of the decoding process for larger regions of the panorama frame. This can further allow the system to lower the decoder luma sample rate, thereby enabling a higher frame rate, a higher resolution panorama, or both.

As introduced above, decoding equirectangular video frames entirely so that only a portion of the decoded frame to be displayed is inefficient. Even if slices or tiles are used for encoding an equirectangular frame, the luma sample rate will vary depending on the region of the panorama frame that is being viewed. Further, when trying to view the top and bottom of a panorama frame, a higher number of samples typically need to be decoded, which may lead to a slowdown of the decoder.

Again, however, some embodiments encode the content based on sections of the frames, and the number of sections per frame that are decoded is limited based on a viewer's field of view and/or anticipated field of view. Not all of the sections of a frame need to be decoded for displaying a portion of the panorama frame. Further, in some implementations each section (e.g., rectilinear sections) can be decoded independent of other sections of the same frame. This allows a predictable way of identifying a minimal number of sections that should be decoded at any moment during playback. The sections of a frame that are not going to be visible to the viewer can often be skipped and not be decoded. As such, the decoder luma sample rate often remains relatively consistent irrespective of the section of the panorama being viewed.

Figure 5:
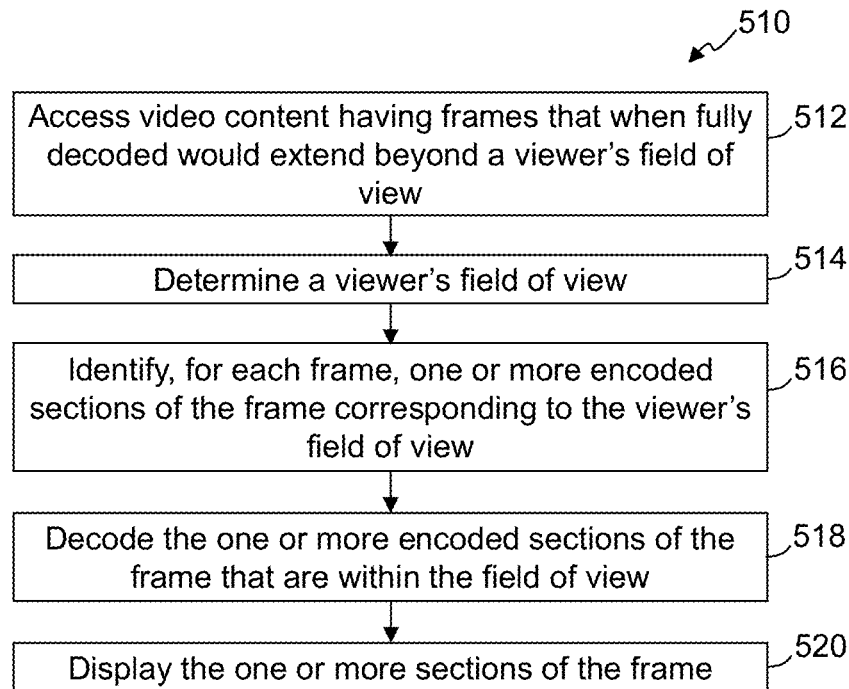
FIG. 5 shows a simplified flow diagram of an exemplary process of decoding and playing back content in accordance with some embodiments.

FIG. 5 shows a simplified flow diagram of an exemplary process 510 of decoding and playing back content in accordance with some embodiments. In step 512, encoded video content is accessed. The video content includes a series of frames of visual content configured to be sequentially played back, where each frame of the series of frames if fully decoded is configured to extend beyond a viewer's field of view. For example, the content can be panoramic video content configured to appear to the viewer when displayed as extending 360 degrees laterally around and/or 180 degrees or more vertical to the viewer. Further, each encoded frame comprises multiple encoded sections of the frame.

In step 514, a field of view of the viewer viewing the video content is determined. The field of view is typically determined relative to an orientation of the content being displayed, whether on a computer monitor, a television, a display, virtually through a HMD, a three dimensional display screen, or the like. In some implementation, the field of view is determined for each frame prior to a portion of each frame being displayed. Further, some embodiments additionally may determine a predicted field of view of the viewer, for example, based on the viewer's movements (e.g., from one or more sensors), viewer control commands, and/or other such information that can alter a viewer's field of view at least relative to the content.

In step 516, one or more sections of one or more frames are identified that correspond to and/or are at least partially within the determined and/or predicted field of view and that are to be visible to the viewer upon displaying the portion of the frame. In many embodiments, the field of view is identified relative to each frame during playback of the video content and sections of each frame are identified as a function of the identified corresponding field of view. Typically, less than all of the sections of a frame are decoded. Some embodiments further access a sections mapping that defines section orientation and/or position information of each of the multiple encoded sections of a frame and coordinate information across the multiple encoded sections. The sections mapping can be evaluating relative to the field of view to identify the encoded sections to be decoded and/or that are within the current or predicted field of view. In some embodiments coordinates of the coordinate information corresponding to the field of view can be identified, and one or more encoded sections of the frame can be identified that are at least partially within the identified coordinates corresponding to the field of view.

One or more thresholds may be considered when determining whether a section is within a field of view or a predicted field of view. In many instances, only a small portion of a section may actually be within the field of view. Accordingly, some embodiments evaluate an amount (e.g., a width, a height, an area, etc.) of a section that is within the determined field of view relative to one or more thresholds (e.g., width threshold, area threshold, etc.), and determine whether the amount of the section that is within the field of view has a predefined relationship with the area threshold. For example, sections are identifying to be decoded when the one or more encoded sections of a frame have at least a threshold amount of the section within the field of view and/or within identified coordinates corresponding to the field of view. In those instances where less than the threshold area of the section is predicted to be within the field of view, some embodiments do not decode the section. For example, some embodiments include a slightly larger border when displaying the portion of the frame, or the sections that are being displayed may be slightly shifted to compensate for the fact that a relatively small area of a non-decoded section is not being displayed. Other embodiments, for example, simply display a slightly reduced sized portion of a frame than a previous frame. The threshold can depend on one or more factors, such as resolution of the displayed portion of the frame, size of the field of view, area or size of sections of the frame, area or size of the section being considered relative to the threshold, and other such factors. Some embodiments compensate for the portion of the undecoded section that would otherwise be within the field of view by using data from one or more of the decoded portions, for example, to fill in the remaining portion of the frame within the field of view. Additionally or alternatively, as this filled portion will most likely be in the peripheral vision, techniques such as repeating the pixels from a current frame or previous frame, techniques such as frame warping could be used, or other such techniques or combinations of such techniques can be used to compensate for the portion of the undecoded section that would have otherwise been within the field of view.

In step 518, the one or more identified encoded sections of the frame are decoded that at least correspond to the identified field of view and are to be visible to the viewer upon displaying the portion of the first frame to be visible to the viewer. Again, fewer than all of the sections of a frame are decoded such that less than all of a frame is decoded. Further, the sections that are decoded correspond to a viewer's current and/or predicted field of view such that they are at least partially within the field of view. In some embodiments, the decoding comprises decoding data sufficient to generate pixel data for the array of pixels of those sections of the first frame that are within the field of view, and generate texture data using the corresponding one or more pixel arrays. Some embodiments determine that one or more sections that were decoded in a previous frame are no longer within the field of view and may prevent the decoding of the one or more section while decoding the sections that are within the field of view. Some embodiments incorporate high-level syntax decoding processes (such as slice headers). In such embodiments, for sections not in the field of view, only high-level syntax decoding may be performed, and computationally intensive processes such as decoding macroblock data, residual data, and/or other such intensive decoding processes are not performed.

As described above and further below, in some instances more than just those sections and/or those frames that directly correspond to and/or are at least partially within the current field of view may be decoded. For example, in some embodiments, movement of the viewer may allow a prediction that a position of the viewer's field of view will soon change to include one or more other sections that currently do not directly correspond with the current field of view. Accordingly, these one or more other sections may also be decoded in anticipation of these sections being displayed relative to the current or subsequent frames.

Further, in some implementations, one or more sections of a current frame that are not intended to be directly displayed relative to the current frame may also be decoded, for example, because one or more frames reference the sections of the current frame (e.g., as sections of a B-frame or P-frame). Accordingly, the decoding of sections may further take into consideration predicted sections of subsequent frames to be displayed and whether those sections reference one or more sections of a current frame. Additionally or alternatively, the decoding of sections may also include identifying that a section of a current frame references one or more sections of one or more previous or subsequent frames and causing the decoding of one or more sections of the one or more previous or subsequent frames. However, in step 518, typically less than all of the current frame is decoded such that one or more of the encoded sections of the current frame that are not to be visible upon displaying the current frame to the viewer are not decoded. Still further, in decoding the one or more sections of a frames, it can be determined that a first section of a frame that was decoded in a previous frame is no longer within a current field of view, and the first section can be prevented from being decoded while decoding the other encoded sections that are to be displayed.

In step 520, the one or more decoded sections of the current frame that are to be visible to the viewer and/or correspond with the field of view are displayed. In many instances the sections of the frames are displayed according to playback timing of the video content and corresponding to when the relevant frame is to be displayed based on that timing. Again, the decoding and displaying of those sections of the frames that correspond with the viewer's field of view results in the decoding and displaying of only a portion of the current frame, and less than all of the current frame is decoded and displayed during playback. In many instances less than 25% of a frame is decoded, and in some instances with some frames less than 84% of a frame is decoded. For example, some decoding may result in decoding a limited number of sections with approximately 90 degrees horizontal and vertical field of view. As further examples, in some implementations only three sections of a total of 12 sections defined over a frame may be decoded and displayed, while other implementations may decode five sections of a total of six sections defined over a frame. This allows the decoding and displaying of panoramic content to be enhanced. Further, latencies can be reduced and/or display quality can be improved.

Figure 6:
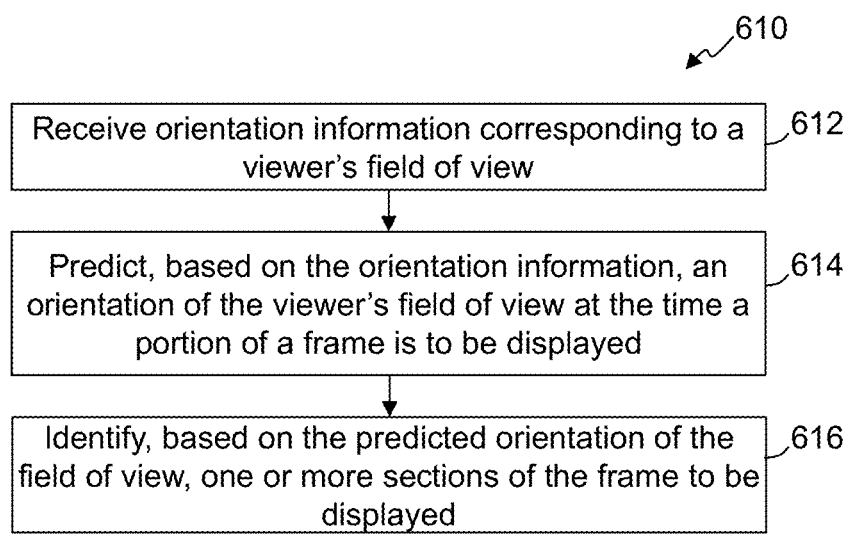
FIG. 6 shows a simplified flow diagram of an exemplary process of identifying sections of a frame that correspond with a viewer's predicted field of view, in accordance with some embodiments.

FIG. 6 shows a simplified flow diagram of an exemplary process 610 of identifying sections of an frame that correspond with a viewer's predicted field of view, in accordance with some embodiments. In step 612, field of view orientation information is received corresponding to a viewer's field of view. The orientation information can be received from one or more sensors, image detection systems, acoustic systems, other such systems or combinations of such systems. The orientation information corresponds to a current position of a viewer's field of view, movement of a user and/or a relative orientation of a viewer relative to the frames, commands dictating a shift in the field of view, and/or other such information that cause changes to a position and/or orientation of the viewer's field of view. The orientation information can include, for example, coordinate position, orientation, acceleration and/or velocity along any axis, tilt, pitch, yaw, roll, and the like. Some embodiments include and/or receive information from one or more sensors or other devices providing the information used to determine relative position and/or movement. For example, some embodiments include and/or receive information from one or more accelerometers, gyroscopes, tilt sensors, optical sensors, image capture circuitry or systems (e.g., camera, video camera, etc.), microphone arrays, acoustic radars, other such devices or information from combinations of such devices. Still further, information may be received through direction instructions and/or commands (e.g., from a mouse, touch screen, keys, buttons, remote control, other such devices or combinations of such devices) that are used in controlling what portion of a frame is within a viewer's field of view. For simplicity, this information is generally referred to as orientation information, and it will be understood by those skilled in the art that such information can include position, orientation, acceleration, velocity, tilt, pitch, yaw, roll, direction instructions, and/or other such relevant information.

The orientation information is used to detect and/or determine a current field of view, movement and/or a lack of movement that affects a viewer's field of view. Again, the movement can be the viewer moving her head (e.g., when using Head Mounted Display (HMD), the viewer is positioned proximate a display, or the like), a command is received (e.g., from a keyboard, remote control, touch screen, etc.) dictating a movement of a position of the field of view relative to the panoramic frame, or other such movement or combinations of such movement. For example, sections of the panorama frame that are to be decoded and those that could be skipped can be identified based on orientation information from an HMD. An HMD can include motion sensors to identify the position and the direction of the HMD in 3D space. This orientation information could be used to identify which sections of the panorama frame the viewer is currently focusing on and/or predict the position and/or orientation of the HMD in the near future (e.g., based on the measured velocity and/or acceleration of the head movement and extrapolating the position data to a position in time).

In step 614, an orientation and/or position of the viewer's field of view is determined and/or predicted at the time a portion of a frame is to be displayed based on the orientation information. When movement is not detected, the field of view is typically predicted to remain the same over one or more frames. In those instances where movement is detected, the orientation information can be evaluated to determine, based on timing of when one or more frames are to be displayed, the position of the field of view when the frame is to be displayed. This evaluation can take into consideration an acceleration, velocity, direction of movement (which may be in two or three dimensions), and the like. Further, a relative position and/or orientation of the field of view is anticipated based on the timing of when a frame is to be displayed. Some embodiments extrapolate a predicted position and/or orientation of the field of view using orientation information, which typically includes a current position and one or more previous positions. Again the orientation information can be obtained from one or more commands (keyboard entries, remote control signals, game controller control signals, mouse signals, etc.) and/or from sensors, and based on the orientation information the position of the field of view can be predicted (e.g., predict the position of the HMD in the near future based on the measured velocity and acceleration of the head movement and extrapolating the orientation information and/or data).

In some embodiments, the position of the field of view and/or the predicted position can be defined based on pan, tilt, x-y-z coordinates and/or other such information. For example, with an HMD in accordance with some implementations, pan and tilt are angles that the HMD makes with respect to X and Y axes. Using at least these two parameters, the sections can be identified that correspond with the current and/or predicted position of the field of view. These identified sections can be decoded to display the pixels for that particular viewing direction. As a further example with respect to FIG. 3, in some implementations when a tilt is greater than 45°, then the decoding of the bottom section 317 could be skipped, and when the tilt is less than −45° the decoding of the top section 316 could be skipped. Similarly, the value of the pan angle could be used to selectively omit the decoding process of one or more of the left section 312, front section 313, right section 314 and back section 315.

In step 616, the frame to be displayed is evaluated relative to the predicted position and/or orientation of the viewer's field of view and/or that a position of the viewer's field of view is predicted to change at the time the frame is to be displayed to identify one or more sections of the frame to be displayed. Often, the field of view extends across at least portions of two or more sections of a frame. As such, decoding can be initiated for the one or more sections identified when displaying the relevant portion of the frame that corresponds with the field of view. For example, some embodiments determine that the viewer's field of view is predicted to change to include at least a portion of one or more other encoded sections of a subsequent frame yet to be displayed. In some instances, the one or more other sections of the subsequent frame correspond in position to one or more sections of a previous first frame that are not being decoded relative to displaying the sections of the first frame.

Further, some embodiments consider whether a threshold amount or area of a section is predicted to be within the field of view. The predicted position and/or change of position of the field of view allows less than all of the sections of a frame to be selected and the decoding of less than all of the frame, which can reduce processing needs, provide reduced latency, potentially reduced memory needs, allow one or more frames to have greater resolution, allow for an increased frame rate, allow for an increased number of independent frames, other such advantages or combinations of such advantages. The prediction of the position of the field of view allows the decoding circuitry and/or decoding system to determine that the viewer's field of view is predicted to shift to include at least a portion of one or more encoded sections of one or more frames yet to be displayed. When there is a shift in position of the field of view, the selected sections typically include one or more sections that correspond to one or more sections of a current frame that are not being displayed in the current frame.

Some embodiments further incorporate a margin of error when predicting a location and/or orientation of the viewer's field of view. For example, some embodiments may be configured to and/or provide an option to be activated to operate such that correctness has a higher priority than latency. An amount or degree of a margin of error applied can depend on many factors, such as but not limited to available spare cycles to perform decoding, predicted latency, memory space and/or other such factors. Additionally or alternatively, some embodiments apply a margin of error when time and/or resources are available. For example, some systems (e.g., low-latency systems) may designate time limits for completing the decoding. Such systems may be configured to determine whether time is available and/or at least a threshold amount of time is available after completing a minimum specified decoding, and when time is available can initiate the decoding of one or more additional sections to provide a margin of error. Alternatively when further time or sufficient spare cycles are not available, errors may be compensated for through padding, concealment, smaller displayed portion of a frame, etc. in case the predicted location and/or orientation of the field of view was inaccurate.

Some embodiments additionally or alternatively apply a range to a predicted location and/or orientation of a field of view (e.g., ranges for pan, tilt, roll, etc.). Similarly, some embodiments evaluate a velocity and/or acceleration and apply a range of velocities centered on an identified velocity and/or a range of acceleration centered on an identified acceleration in performing calculations to predict a position of the field of view. This may result in identifying an estimated field of view that is actually larger than the viewer's actual field of view.

As described above, one or more of the predicted sections of a first frame that are anticipated to be within the field of view may reference one or more sections of a previous or subsequent frame (e.g., when the first frame is a P-frame or a B-frame). Accordingly, some embodiments further identify one or more additional reference sections of previous and/or subsequent frames that the one or more sections of the first frame reference. In many instances, these one or more additional sections of the previous and/or subsequent frames correspond in position to the one or more predicted sections of the first frame. One more of these additional sections may not correspond to the field of view identified or predicted for the previous and/or subsequent frames, but can be decoded because of the reference to the additional sections by the predicted sections. The one or more additional sections of the previous and/or subsequent frames can then be decoded, and in some instances are decoded along with other sections of those frames that are or predicted to be within the field of view when those frames are to be displayed. This allows the decoder to reference one or more additional sections of one or more previous and/or subsequent frames when decoding the one or more predicted sections of the first frame.

Further, some embodiments predict that a relative position of the viewer's field of view is to change at a time corresponding to when a subsequent frame is to be displayed (typically subsequent in playback timing) and determines a predicted position of the viewer's field of view relative to the subsequent frame. Based on the predicted position of the viewer's field of view, one or more predicted sections of the subsequent frame are identified that are anticipated to be at least partially within the predicted position of the viewer's field of view. In decoding sections from the subsequent frame at least the one or more predicted sections of the subsequent frame are decoded in response to the predicting the change of the relative position of the viewer's field of view.

Further, some embodiments take into consideration bitrate, resolution and/or other such factors in determining timing. For example, with a predetermined or defined bitrate and resolution, the decoding time for I-frames typically does not vary much across a bitstream. Similarly, P-frames take a similar amount of time for decoding. As such, the performance and/or timing of the decoder is known, and the time to decode a section can be estimated as a function of the bitrate, and the characteristics of the section (e.g., I/P/B, number of macroblocks in section, ratio of number of I/P/B macroblocks in section, and the like). Additionally, with decoder performance known, some embodiments are configured to predict the time taken to begin decoding sections of a subsequent frame. Using the position and motion data from the sensors, the location and/or orientation of the FOV at a current or future point in time can be predicted. Further, some implementations take into consideration subsequent frames referencing a frame currently being decoded. For example, when a next or other subsequent frame is a P-frame that references a current frame, one or more additional sections may be decoded when the predicted orientation of the field of view is predicted to refer to corresponding additional sections in the subsequent frame. Additionally or alternatively, some embodiments use neighborhood mapping to decode additional sections based orientation information or even without utilizing orientation and/or sensor information. In some instances, a prediction for a future frame is not implemented when the subsequent frame is an I-frame.

While the future field of view predictions may be used in some embodiments to predict a time when the subsequent frame decoding is likely to begin, some embodiments further apply a refinement to predict when the decoding is likely to be complete and the frame would be ready for display. In some embodiments, such as some that are utilized within a closed system, the latency of the display and/or decoding system, hardware and/or the libraries used to render sections of frames are also known. This latency can be incorporated in the field of view orientation determination and/or prediction, which can make the pixels rendered on the display closely match the movement commands (e.g., HMD motion). Such field of view refinement can be used, in some embodiments, for both the current frame as well as a future frame.

Figure 7:
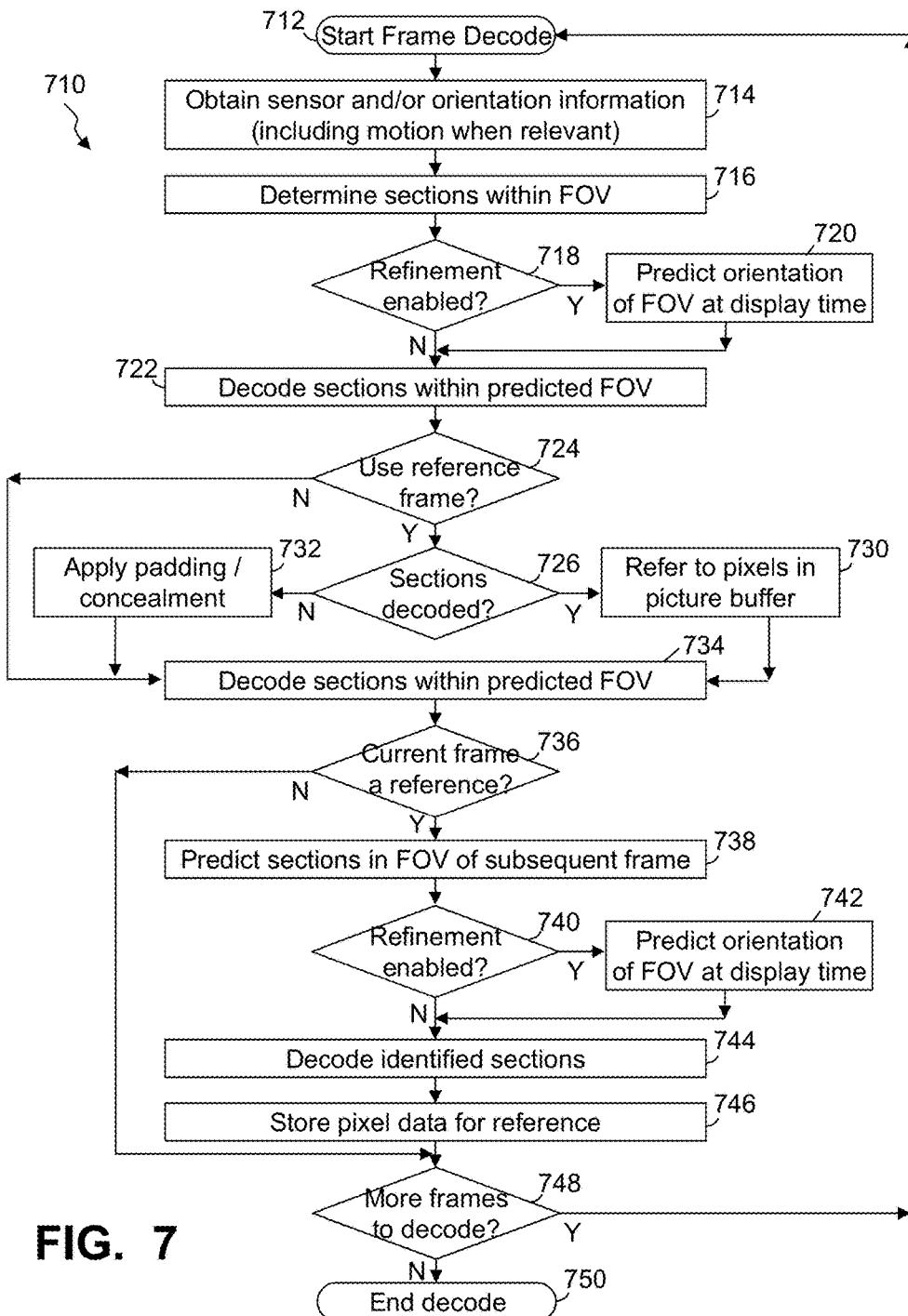
FIG. 7 depicts a simplified flow diagram of a process of decoding sections of a sequence of frames of multimedia content in accordance with some embodiments.

FIG. 7 depicts a simplified flow diagram of a process 710 of decoding sections of a sequence of frames of multimedia content (e.g., video content) in accordance with some embodiments. In step 712 decoding of a frame is initiated. In step 714, field of view orientation information is obtained. As described above, the orientation information can be received from one or more sensors, image detection systems, movement commands (e.g., arrow key activation, mouse movement and the like), and etc., and can include coordinates, pan, tilt, roll, motion (e.g., velocity, acceleration, etc.), pitch, yaw, roll, and/or other such information. For example, sensors of an HMD can provide orientation information that can be used to determine and/or predict an orientation of the user's field of view.

In step 716, determine which sections of a frame to be decoded are within the field of view using the orientation information. In step 718, it is determined whether field of view refinement processing is enabled. As described above, some embodiments further apply a refinement to predict when the decoding is likely to be complete and the frame would be ready for display and determine the relevant sections of the frame that are at least partially within the predicted and refined field of view. When refinement is enabled, step 720 is entered to predict the orientation of the field of view at the time the frame being decoded is to be displayed. Typically, some or all of the orientation information is utilized (including position and motion information) to predict the orientation of the field of view. In step 722, those sections identified in steps 716 and/or 718 to be within the field of view are decoded.

In step 724, it is determined whether the current frame references one or more other frames to be used in decoding the current frame. When the current frame is not referencing another frame, the process 710 advances to step 734. Alternatively, step 726 is entered to determine whether the relevant sections of the one or more frames being referenced were decoded and are accessible and usable, and/or whether the sections are decoded correctly. When the corresponding sections of the referenced frames have been decoded step 730 is entered where a decoded picture buffer is accessed and the relevant pixel data of the relevant sections are accessed. Alternatively, step 732 is entered to compensate for missing pixel data from sections that were not decoded and/or not correctly decoded. The compensation can include applying padding, applying a concealment and/or other such compensations to fill in pixels of the current frame that refer to missing referenced pixel data of referenced frames. For example, some embodiments utilize pixels from previous or current decoded sections to fill the display. In some embodiments, the filling is activated when a visible portion of a section is lower than a threshold. Similarly, some embodiments are configured to use pixels from past or current decoded sections to fill the display when the detected motion is too unpredictable and/or some predicted reference pixels are not available. Further, some embodiments compensating for decoding time and apply this correction while determining a field of view for current and/or future frames.

In step 734, the pixel data of the decoded sections are utilized to generate textures and perform graphics rendering operations to display visible pixel through a display system (e.g., HMD). In step 736, it is determined whether the current frame is referenced by one or more other frames yet to be decoded. When the current frame is not referenced, the process 710 advances to step 748. Alternatively, step 738 is entered and previous and/or subsequently obtained orientation information, and in some instances coordinate information, neighboring information and/or other such mapping information is utilized to predict an orientation of the viewer's field of view and identify sections of the current frame that are predicted to be in the predicted field of view with the subsequent frame referencing the current frame is to be decoded.

In step 740, it is determined whether field of view refinement processing is enabled. The process 710 advances to step 742 when refinement is enabled motion, position and/or other such orientation information is used to predict the orientation of the field of view at the time the referencing frame is to be displayed. In step 744 the referenced sections that are predicted to be within the field of view and that have not already been decoded are decoded. In step 746, the pixel data of the decoded sections are stored in one or more buffers (e.g., different buffer for each section) for reference in decoding one or more subsequent frames. In step 748, it is determined whether further frames are to be decoded. When there are further frames the process 710, in some embodiments, returns to step 712. Alternatively, the decoding ends in step 750.

Figure 8:
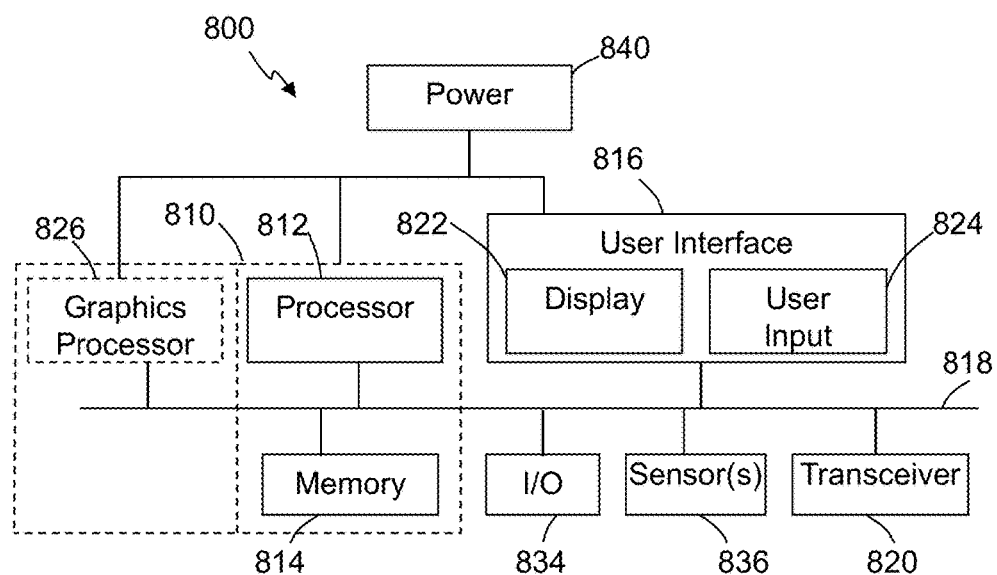
FIG. 8 illustrates an exemplary circuitry and/or system for use in implementing methods, techniques, devices, apparatuses, systems, servers, sources and the like to encode and/or decode multimedia content, in accordance with some embodiments.

The methods, techniques, systems, devices, services, servers, sources and the like described herein may be utilized, implemented and/or run on many different types of devices and/or systems. Referring to FIG. 8, there is illustrated a system and/or circuitry 800 that may be used for any such implementations, in accordance with some embodiments. One or more components of the system 800 may be used for implementing any system, apparatus or device mentioned above or below, or parts of such systems, apparatuses or devices, such as for example any of the above or below mentioned decoders, encoders, display systems, HMDs, displays, televisions, computers, image processors or processing systems, cameras, sensors, detectors, content sources, detector processing systems, coordinate determination systems, graphics processor and/or generator systems, controllers, orientation tracking systems, and the like. However, the use of the system 800 or any portion thereof is certainly not required.

By way of example, the system 800 may comprise a controller or processor module 812, memory 814, and one or more communication links, paths, buses or the like 818. Some embodiments include a user interface 816. A power source or supply 840 is included or coupled with the system 800. The controller 812 can be implemented through one or more processors, microprocessors, central processing unit, logic, local digital storage, firmware and/or other control hardware and/or software, and may be used to execute or assist in executing the steps of the processes, methods and techniques described herein, and control various communications, programs, content, listings, services, interfaces, etc. Further, in some embodiments, the controller 812 can be part of a control system 810 and/or implemented through one or more processors with access to one or more memory 814. In some embodiments, the control system additionally or alternatively includes a graphics and/or image processor 826 that may be part of or separate from the processor 812. The graphics processor 826 has access to the memory 814 to access multimedia content and/or store processed graphics, video, images and the like. The user interface 816 can allow a user to interact with the system 800 and receive information through the system. In some instances, the user interface 816 includes one or more displays 822 (e.g., HMD may have a display for each eye) and/or one or more user inputs 824, such as a remote control, keyboard, mouse, track ball, game controller, buttons, touch screen, etc., which can be part of or wired or wirelessly coupled with the system 800.

Typically, the system 800 further includes one or more communication interfaces, ports, transceivers 820 and the like allowing the system 800 to communication over a communication bus, a distributed network, a local network, the Internet, communication link 818, other networks or communication channels with other devices and/or other such communications or combinations thereof. Further the transceiver 820 can be configured for wired, wireless, optical, fiber optical cable or other such communication configurations or combinations of such communications.

The system 800 comprises an example of a control and/or processor-based system with the controller 812 and/or graphics processor 826. Again, the controller 812 and/or graphics processor 826 can be implemented through one or more processors, controllers, central processing units, logic, software and the like. Further, in some implementations the controller 812 and/or graphics processor 826 may provide multiprocessor functionality.

The memory 814, which can be accessed by the controller 812 and graphics processor 826, typically includes one or more processor readable and/or computer readable media accessed by at least the controller 812, and can include volatile and/or nonvolatile media, such as RAM, ROM, EEPROM, flash memory and/or other memory technology. Further, the memory 814 is shown as internal to the system 810; however, the memory 814 can be internal, external or a combination of internal and external memory. Similarly, some or all of the memory 814 can be internal, external or a combination of internal and external memory of the controller 812. The external memory can be substantially any relevant memory such as, but not limited to, one or more of flash memory secure digital (SD) card, universal serial bus (USB) stick or drive, other memory cards, hard drive and other such memory or combinations of such memory. The memory 814 can store video content, multimedia content, images, code, software, executables, scripts, data, content, coordinate information, virtual environment coordinates, programming, programs, media stream, media files, textual content, identifiers, log or history data, user information and the like.

Some embodiments further include one or more input output interfaces 834 that allow the system to couple with one or more external devices, such as but not limited to multimedia content sources, display systems, sensors and/or other such devices. One or more sensors 836 may additionally or alternatively be included in the system 800 in some embodiments. As described above, the system may receive sensor and/or other positional information to identify a current field of view and/or predict a position of the field of view. Orientation information can be received through the sensors 834 and/or the transceiver 820 to allow the system to determine relevant fields of view and identify corresponding sections of frames to be decoded and displayed so that less than all of a frame is decoded.

One or more of the embodiments, methods, processes, approaches, and/or techniques described above or below may be implemented in one or more computer programs executable by one or more processor-based systems. By way of example, such a processor based system may comprise the processor based system 800, a computer, a set-top-box, an television, an IP enabled television, digital media player, a PlayStation TV, a Blu-ray player, an IP enabled Blu-ray player, a DVD player, entertainment system, gaming console, graphics workstation, tablet, camera, encoder, decoder, HMD, virtual reality system, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques to display and/or playback video content and/or images having frames that if fully displayed would extend beyond a viewer's field of view and/or to decode and display portions of and less than all of each frame consistent with a viewer's field of view. As another example, such computer programs may be used for implementing any type of tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, approaches, and/or techniques described herein. For example, some embodiments provide one or more computer-readable storage mediums storing one or more computer programs for use with a computer simulation, the one or more computer programs configured to cause a computer and/or processor based system to execute steps comprising: accessing video content comprising a series of frames of visual content configured to be sequentially played back, wherein each frame of the series of frames when fully decoded would extend beyond a viewer's field of view, and wherein each encoded frame comprises multiple encoded sections of the frame; determining, prior to a portion of a first frame being displayed, a field of view of the viewer viewing the video content; identifying, during playback of the video content and as a function of the field of view, one or more encoded sections of the first frame corresponding to the field of view and that are to be visible to the viewer upon displaying the portion of the first frame; decoding the one or more encoded sections of the first frame that are to be visible to the viewer upon displaying the first frame while not decoding one or more of the encoded sections of the first frame that are not to be visible to the viewer; and displaying, according to playback timing of the video content and corresponding to when the first frame is to be displayed, the one or more sections of the first frame that are to be visible to the viewer such that the portion of the first frame is displayed, and wherein less than all of the first frame is decoded and less than all of the first frame is displayed during playback.

Other embodiments provide one or more computer-readable storage mediums storing one or more computer programs configured for use with a computer simulation, the one or more computer programs configured to cause a computer and/or processor based system to execute steps comprising: accessing video content comprising multiple frames of visual content, wherein each of the multiple frames if fully displayed would extend beyond a field of view of a viewer; applying a rectilinear projection to each frame of the multiple frames; dividing each of the rectilinear projected frames into a plurality of adjacent sections extending over an entire area of each of the rectilinear projected frames; and encoding, for each frame of the multiple frames, each of the plurality of sections such that each section of a frame is decodable independent of the other sections of the frame.

Some embodiments provide a head mounted displays (HMD) and/or other such virtual reality display systems that allow the users to be immersed in a virtual world where the head position and direction of the user determines the content being viewed. Besides being used for video games, HMDs can also be used to view video panoramas. As described above, many video panoramas are typically created using multiple cameras capturing footage from the same location, but pointing in different directions. The corresponding images of the video from each camera are stitched together. This allows the viewer the freedom to choose the sections of the panorama frames to view. When viewing video panoramas, for example using an HMD or through a high definition display or television, the frames of the video are typically displayed at high frame rates to provide a smooth, immersive experience. Another aspects that can improve the user experience is capturing the videos at a high resolution (e.g., 1280×720 p, 1920×1080 p, or higher) so that the frames that are displayed are sharp and detailed. Video sequences are often stored as encoded or compressed bitstreams, and these are decoded and/or uncompressed before they are available for display. As described above, however, decoding high resolution videos at high frame rates is a computationally intensive task, and it may not be feasible even on many current processors to effectively decode full panoramic frames and display the high resolution videos at high frame rates.

Some present embodiments, however, limit the amount of a frame that is decoded, which can allow high resolution (e.g., HD (e.g., 1280×720 p, 1920×1080 p), Ultra HD (e.g., 3840×2160 p, 7680×4320 p, etc.) or higher) 360 degree video panorama bitstreams to be decoded at a fast rate, so that these video frames can be rendered and viewed using an HMD, television, display or the like. This typically provides the user with a vastly improved experience compared to low resolution or low frame rate visuals. In some embodiments, the video capture and panorama creation system defines each frame into multiple sections and encodes each frame according to the defined sections. This allows a displaying device to select less than all of the sections of a panorama frame and decode the selected sections (typically independently decode the selected sections) with minimal overhead. The displaying system and/or playback device utilizes orientation information (e.g., information from a HMD's motion sensors) to identify a user's field of view and/or predicted position of the field of view in evaluating the video panorama bitstreams created to identify sections of relevant frames and decode those sections of the panorama video that intersect and/or are predicted to intersect the user's field of view.

By decoding a partial video panorama frame and not an entire panorama frame, higher frame rendering performance can be achieved. In some embodiments, this higher frame rendering performance can be achieved using standard processors and often without using high end processors. Further, the decoding of less than all of the frame, in at least some implementations, eliminates common issues associated with slow rendering, such as visuals not keeping up with fast head movement and/or fast movements of the relative field of view.

Some embodiments provide systems and/or methods of converting individual video frames from different cameras used to capture viewing angles for a 360 degree panorama into compressed video bitstreams that allow fast decoding when combined with a panorama viewer such as an HMD. Methods of video bitstream creation, in accordance with some embodiments, allow a display system (e.g., HMD, computer, television, etc.) to be used with processors that do not have the capability to decode entire 360 degree video panoramas at relatively fast frame rates, such as rates of 60 Hz and greater. Position and/or viewing information is utilized to identify a field of view and/or predict a position of the field of view to partially decode and display the relevant sections and/or video data corresponding to the field of view, and significantly reduce unnecessary video decoding processes. Some embodiments utilize a viewing neighborhood map or other such mapping to identify sections or regions of a frame that may be viewed in the immediate future and has this frame data ready to limit and/or avoid issues with fast head movement.

This process of encoding to define sections and decoding those relevant sections within a field of view can further be applied to three-dimensional (3D) video content. In some embodiments, during the panorama frame creation and/or encoding process, each section of a frame is made up of stereoscopic (two views) video data. This stereoscopic video could be encoded using a 3D video compression standard such as Multiview Video Coding (MVC). Some embodiments comprise two images or frames (e.g., left and right). Mapping can specify the relationships of sections within each frame, and in some implementation, the same mapping references both stereoscopic frames. The selection of sections and the decoding of sections is essentially the same but implemented for each stereoscopic frame of the 3D video. The decoded sections for the left view are then rendered using the correct projection to the left (e.g., on to the left display of the HMD) and a similar procedure is performed to obtain the data for the correct projection to the right (e.g., on the right display of the HMD).

Some embodiments provide methods of playing back multimedia content, comprising: accessing video content comprising a series of frames of visual content configured to be sequentially played back, wherein each frame of the series of frames when fully decoded would extend beyond a viewer's field of view, and wherein each encoded frame comprises multiple encoded sections of the frame; determining, prior to a portion of a first frame being displayed, a field of view of the viewer viewing the video content; identifying, during playback of the video content and as a function of the field of view, one or more encoded sections of the first frame corresponding to the field of view and that are to be visible to the viewer upon displaying the portion of the first frame; decoding the one or more encoded sections of the first frame that are to be visible to the viewer upon displaying the first frame while not decoding one or more of the encoded sections of the first frame that are not to be visible to the viewer; and displaying, according to playback timing of the video content and corresponding to when the first frame is to be displayed, the one or more sections of the first frame that are to be visible to the viewer such that the portion of the first frame is displayed, and wherein less than all of the first frame is decoded and less than all of the first frame is displayed during playback.

Exemplary processes and/or methods are representatively described above based on one or more flow diagrams, timing diagrams and/or diagrams representing sequences of actions and/or communications that include one or more steps, subprocesses, communications and/or other such representative divisions of the processes, methods, etc. These steps, subprocesses or other such actions can be performed in different sequences without departing from the spirit of the processes, methods and apparatuses. Additionally or alternatively, one or more steps, subprocesses, actions, etc. can be added, removed or combined in some implementations.

While the invention herein disclosed has been described by means of specific embodiments, examples and applications thereof, numerous modifications and variations could be made thereto by those skilled in the art without departing from the scope of the invention set forth in the claims.

What is claimed is:

1. A method of playing back multimedia content, comprising:
    accessing video content comprising a series of images called video frames that are configured to be sequentially played back at a rapid rate to display the video content, wherein each video frame of the series of video frames when fully decoded would extend beyond a viewer's field of view, and wherein each encoded video frame comprises multiple encoded sections, wherein each of the multiple encoded sections of a video frame is configured to be decoded independent of any of the other of the multiple encoded sections of the video frame;
    determining, prior to a portion of a first video frame being displayed, a field of view of the viewer viewing the video content;
    identifying, as a function of the field of view, one or more sections of the first video frame that are at least partially within the field of view and where at least a portion of the one or more sections are to be visible to the viewer upon displaying the portion of the first video frame;
    decoding the one or more sections of the first video frame that are at least partially within the field of view while not decoding one or more of the sections of the first video frame that are not within the field of view; and
    displaying, according to playback timing of the video content and corresponding to when the first video frame is to be displayed, the one or more decoded sections of the first video frame such that the portion of the first video frame is displayed, and wherein less than all of the first video frame is decoded and less than all of the first video frame is displayed during playback.

2. The method of claim 1, wherein the determining the field of view comprises determining that a position of the viewer's field of view is predicted to change to include at least a portion of one or more other sections of a subsequent video frame yet to be displayed, wherein the one or more other sections correspond to one or more additional sections of the first video frame that are not being displayed; and
    decoding of at least the one or more other sections of the subsequent video frame in response to the predicted change in the position of the field of view.

3. The method of claim 2, wherein the initiating the decoding of the at least the one or more other sections of the subsequent video frame comprises initiating the decoding of one or more reference sections of one or more reference video frames and upon which the subsequent video frame references.

4. The method of claim 2, further comprising:
determining, in decoding the one or more other sections of one of the subsequent video frames, that a first section that was decoded in a video frame previous to a first of the subsequent video frames is no longer within the field of view, and preventing the decoding of the first section while decoding the at least the one or more other sections of the first subsequent video frame.

5. The method of claim 1, further comprising:
receiving orientation information;
predicting, based on the orientation information and on a timing of when a portion of a subsequent video frame is to be displayed, an orientation of the viewer's field of view;
identifying, based on the predicted position of the viewer's field of view, one or more sections of the subsequent video frame to be displayed that are anticipated to be at least partially within the predicted position of the viewer's field of view.

6. The method of claim 1, wherein the identifying the one or more sections of the first video frame corresponding to the field of view comprises:
accessing a sections mapping, wherein the sections mapping comprises section position information of each of the multiple sections of the first video frame and coordinate information across the multiple sections; and
evaluating the sections mapping relative to the field of view.

7. The method of claim 6, wherein the evaluating the sections mapping comprises identifying coordinates of the coordinate information corresponding to the field of view, and identifying the one or more sections of the first video frame that are at least partially within the identified coordinates corresponding to the field of view.

8. The method of claim 7, wherein the identifying the one or more sections of the first video frame that are at least partially within the identified coordinates comprises identifying the one or more sections of the first video frame that have at least a threshold amount of the section within the identified coordinates.

9. The method of claim 1, further comprising:
defining, for each of the multiple video frames, the multiple sections of each video frame such that the multiple sections extend across the entirety of a video frame.

10. The method of claim 9, further comprising:
defining, for each video frame of the multiple video frames, coordinate information extending over the entire video frame; and
specifying coordinates from the coordinate information for each of the sections of the video frame.

11. The method of claim 9, further comprising:
identifying, for each section of the video frame, neighboring sections and defining a mapping associating each section of the video frame with each neighboring section.

12. The method of claim 11, wherein the defining the mapping comprises:
identifying boundaries of the video frame;
identifying two boundary sections of the multiple sections, wherein a first section of the two boundary sections has a boundary corresponding a first boundary of the video frame, and a second section of the two boundary sections has boundary corresponding to a second boundary of the video frame; and
defining that the first boundary is adjacent to the second boundary defining a 360 degree video frame.

13. The method of claim 11, further comprising:
identifying, as a function of the field of view, one or more other sections of the first video frame that are not at least partially within the field of view; and
decoding the one or more other sections of the first video frame at a resolution lower than a resolution for which the one or more sections of the first video frame that are at least partially within the field of view are decoded.

14. A method, comprising: receiving information from one or more sensors configured to determine at least one of a position and an orientation of an apparatus that includes one or more displays, wherein at least one of the one or more displays is capable of displaying video content comprising a series of images called video frames that are configured to be sequentially played back at a rapid rate to display the video content, and wherein each encoded video frame comprises multiple encoded sections; using the information from the one or more sensors to identify one or more sections of a first video frame of the video content that are to be decoded, wherein the first video frame of video content includes a plurality of sections that are each configured to be decoded independently of the other sections of the first video frame of video content; decoding the identified one or more sections of the first video frame while not decoding one or more other sections of the first video frame, wherein the one or more decoded sections of the first video frame are at least partially within a field of view of a viewer and the one or more other sections of the first video frame that are not decoded are not within the field of view of the viewer; and displaying the one or more decoded sections of the first video frame on at least one of the one or more displays while not displaying the one or more other sections of the first video frame that are not decoded such that less than all of the first video frame is displayed.

15. The method of claim 14, wherein the apparatus comprises a head mounted display (HMD).

16. The method of claim 14, wherein the one or more sensors comprise at least one of an accelerometer, a gyroscope, a tilt sensor, an optical sensor, and an image detection system.

17. The method of claim 14, wherein the apparatus comprises at least one of the one or more sensors.

18. A system, comprising: an apparatus that includes one or more displays, wherein at least one of the one or more displays is capable of displaying video content comprising a series of images called video frames that are configured to be sequentially played back at a rapid rate to display the video content, and wherein each encoded video frame comprises multiple encoded sections; one or more sensors configured to determine at least one of a position and an orientation of the apparatus; and a processor based system that is configured to perform steps comprising: receiving information from the one or more sensors; using the information from the one or more sensors to identify one or more sections of a first video frame of the video content that are to be decoded, wherein the first video frame of video content includes a plurality of sections that are each configured to be decoded independently of the other sections of the first video frame of video content; decoding the identified one or more sections of the first video frame while not decoding one or more other sections of the first video frame, wherein the one or more decoded sections of the first video frame are at least partially within a field of view of a viewer and the one or more other sections of the first video frame that are not decoded are not within the field of view of the viewer; and displaying the one or more decoded sections of the first video frame on at least one of the one or more displays while not displaying the one or more other sections of the first video frame that are not decoded such that less than all of the first video frame is displayed.

19. The system of claim 18, wherein the apparatus comprises a head mounted display (HMD).

20. The system of claim 18, wherein the one or more sensors comprise at least one of an accelerometer, a gyroscope, a tilt sensor, an optical sensor, and an image detection system.

21. The system of claim 18, wherein the apparatus comprises at least one of the one or more sensors.

* * * * *